UNITED STATES PATENT OFFICE.

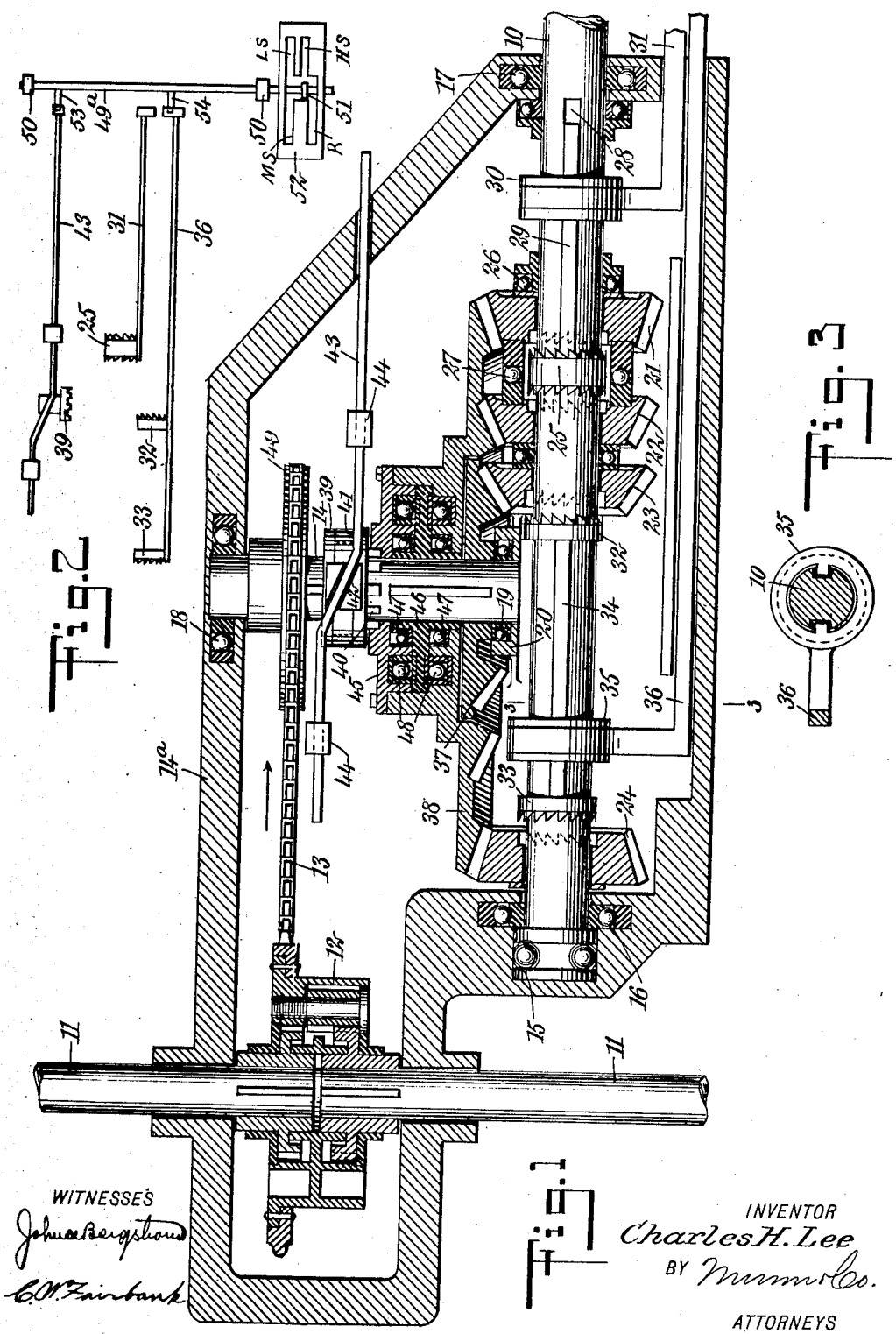

CHARLES HENRY LEE, OF NEW YORK, N. Y.

SPEED-CHANGING GEAR.

No. 892,859.　　　Specification of Letters Patent.　　　Patented July 7, 1908.

Application filed June 21, 1907. Serial No. 380,044.

*To all whom it may concern:*

Be it known that I, CHARLES HENRY LEE, a citizen of the United States, and a resident of the city of New York, borough of Manhattan, in the county and State of New York, have invented a new and Improved Speed-Changing Gear, of which the following is a full, clear, and exact description.

This invention relates to certain improvements in speed changing gears especially adapted for use on motor vehicles, and the object of the invention is to provide means whereby a driven shaft may be rotated in either direction or at any one of a plurality of different speeds by a driving shaft, whereby all of the low speed and reversing speed gear wheels may be permitted to remain stationary while the highest speed gear wheels are in operation.

The invention consists in certain features of construction and combination of parts, all of which will be fully set forth hereinafter and particularly pointed out in the claims.

Reference is to be had to the accompanying drawings, forming a part of this specification, in which similar characters of reference indicate corresponidg parts in all the figures, and in which Figure 1 is a horizontal axial section through my improved speed changing gear and the parts employed in connection therewith; Fig. 2 is a diagrammatic illustration of the operating mechanism; and Fig. 3 is a transverse section on the line 3—3 of Fig. 1.

My improved device is especially adapted for use upon motor vehicles, and in the accompanying drawings I have illustrated it as serving to transmit motion from the main drive shaft 10 to the two-part axle 11. The axle 11 is provided with any suitable form of transmission gearing 12, operatively connected by a drive chain 13 to the driven shaft 14 of the speed changing gear. The transmission gearing and the speed changing gear are both inclosed within a single casing 14ª, the walls of which provide bearings for the several shafts and other rotating members. As shown, the drive shaft 10 extends entirely across the casing 14ª, and one end terminates at thrust bearings 15 and supporting bearing 16, while the other end passes through suitable bearings 17 on the way to the engine or other prime mover. The driven shaft 14 is supported to lie in the same plane as the driving shaft and at right angles thereto, said shaft having one end thereof supported in bearings 18 in one wall of the outer casing, and the other end supported within bearings 19 in a bracket 20 extending inward from the wall of the casing. Upon the drive shaft are mounted a plurality of bevel pinions, each of which is adapted to be operatively connected to said shaft or freely rotate thereon, and the driven shaft 14 is provided with means intermeshing with said pinions, whereby the motion of the driving shaft may be imparted to the driven shaft. As shown, pinions are provided for transmitting motion at any one of three speeds in one direction or at one speed in the opposite direction, by facing three of the pinions 21, 22 and 23 in one direction to mesh with three concentric faces of the bevel gears on the driven shaft and facing a fourth pinion 24 in the opposite direction to engage with one of the faces of one of the gear wheels at a point diametrically opposite to that at which the first three pinions engage. For operatively connecting the pinions to the shaft, I provide each pinion with a series of recesses in one face thereof, which recesses engage with teeth upon longitudinally movable collars keyed to the driven shaft, whereby any one of the pinions may be caused to rotate with the corresponding collar and the shaft.

Between the pinions 21 and 22 I provide a collar 25 having teeth extending longitudinally in opposite directions and movable to bring the teeth into engagement with either the pinion 21 or the pinion 22. The pinion 21 is preferably held against end thrust by a suitable bearing 26, and surrounding the collar 25 and spaced therefrom is a suitable ball bearing 27 to hold the pinions at a definite distance from each other and support the pinion 22 against end thrust. For moving the collar, I provide the shaft 10 with keyways 28 in opposite sides thereof, and within the keyways are provided longitudinally movable keys or feathers 29, each having one end connected to the collar 25 and having the opposite or outer end connected to a suitable collar 30. Any suitable means, as, for instance, a longitudinally movable bar 31, is provided for moving the outer collar 30 and the keys 29 to bring the toothed collar 25 into operative engagement. Similar means are provided for operatively connecting the pinions 23 and 24 to the shaft, although due to the distance between said pinions, I preferably provide two clutch collars 32 and 33, each having teeth upon its outer surface adapted to engage with corresponding recesses in the faces of the pinions. The two collars 32 and 33 are connected together by keys 34 lying in keyways in the drive shaft, and the keys are secured to a collar 35 in operative engagement with a suitable longitudinally movable bar 36 extending out through the wall of the casing parallel to the operating bar 31. By moving either the bar 31 or the bar 36 in either direction, any one of the four pinions may be brought into engagement with the bevel gear wheels upon the driven shaft to rotate the latter.

In order that the fewest number of parts possible may be in motion when the driven shaft is being rotated at its highest speed, I provide the latter with two separate bevel gear wheels 37 and 38 having the faces thereof lying concentric with each other and having independent means for securing them to the driven shaft. The inner or high speed gear wheel 37 preferably fits within a recess in the face of the larger gear wheel 38 and is keyed to the driven shaft and remains in mesh with the high speed pinion 23 at all times. The outer gear wheel 38 is provided with two separate beveled faces concentric with the face of the high speed bevel gear wheel 37, the outer face being in mesh with the pinions 21 and 24 for transmitting motion at the lowest speed or in the reverse direction, and the inner face in engagement with the pinion 22 for driving the shaft at the intermediate speed. As previously stated, the gear wheel 37 is keyed to the shaft 14, but the bevel gear 38 is provided with means whereby it may be disengaged from operation in respect to said shaft when the collar 32 is moved into engagement with the pinion 23 to cause the driven shaft to rotate at its highest speed. This means preferably comprises a clutch collar 39 longitudinally movable but non-rotatably mounted upon the shaft 14 and having a series of teeth 40 adapted to be brought into operative engagement with the gear wheel 38 or a member rigid therewith. Surrounding the collar 39 is a non-rotatable collar or yoke 41 having an inclined slot in a block 42 secured thereto, said slot being in engagement with a beveled portion of a longitudinally movable rod 43. This rod is held from lateral movement by suitable guides 44, and by moving it longitudinally the cam or inclined portion engages in the slot in the block 42 and forces the collar 39 into or out of engagement with a plate 45 rigidly secured to the gear wheel 38. The plate 45 serves to close a chamber within the gear wheel, said chamber containing the bearings supporting the gear wheel and holding its against end thrust. Within the casing 14ᵃ is a collar 46 keyed to the shaft and having a cylindrical bearing surface engaging with the inner ball bearings 47, and having oppositely disposed lateral faces engaging with the end thrust ball bearings 48. The shaft 14 is provided with a suitable sprocket wheel 49 over which the chain 13 leading from the transmission gear 12 passes.

In the normal operation of my device, that is, when the device is reversed or is run at its lowest or its medium speed, the bar 43 remains in the position indicated in Fig. 1, and the gear wheel 38 is operatively connected to the driven shaft, but when the bar 36 is moved outward to throw the high speed pinion 23 into operation, means are provided for simultaneously moving the collar 39 outward to disengage the gear wheel 38 from the driven shaft. Thus, when the parts are operatively connected for the highest speed, the three pinions 21, 22 and 24 and the gear wheel 38 remain stationary, and only the pinion 23 and the inner gear wheel 37 are rotated. In this manner all parts not positively necessary in the transmission of the power from one shaft to the other when the highest speed is being developed are thrown out of commission, so that no energy is wasted in rotating these parts, and the resistance which they offer to rotation at high speed is eliminated.

Any suitable means may be provided for disengaging the collar 39 from the gear wheel 38 when the pinion 23 is in operation, and returning the collar to the position shown in the drawings, when any one of the pinions 21, 22 or 24 is operatively connected to the drive shaft, or when the entire device is disconnected, as indicated in Fig. 1.

In Fig. 2, I have illustrated diagrammatically a common form of operating mechanism modified to be applicable to my device. A longitudinally movable oscillating shaft 49ᵃ is suitably mounted within a bearing 50 and provided with an operating lever 51 extending upward through a slot in a controlling plate 52. The shaft carries two arms 53 and 54, one of which may be brought into operative engagement with the bar 43, and the other of which may be brought into operative engagement with either the bar 31 or the bar 36. The slot in the plate 52 is so arranged that when the shaft is moved to one limiting position the lever may be moved backward or forward into the branch slots L S or M S, and the arm 54 will be in operative engagement with the bar 31 to cause an engagement of either the pinion 21 or the pinion 22 to give the low speed or the medium speed. When the oscillating shaft 49ᵃ is moved to the position indicated in the drawings in Fig. 2, the operating lever 51 can only be moved into the branch slot H S of the plate 52, and at this time the arm 53 engages with the bar 43 to operate the clutch collar 39 and the arm 54 engages with the bar 36 to operate the clutch collar 32 of the high speed pinion. When the collar is moved further to its opposite limiting position, the operating lever can only be moved into the slot R and the clutch collar 33 is brought into engagement with the pinion 24 to reverse the direction of rotation of the driven shaft. It will thus be noted that by the movement of the lever 51, it is impossible to move the bar 31 simultaneously with the bar 36 or with the bar 43, and that the only time the arm 53 is in engagement with the bar 43 to move the latter the only clutch collar which can be brought into engagement with its corresponding pinion is the collar 32 of the high speed pinion.

Having thus described my invention, I claim as new and desire to secure by Letters Patent:

1. A speed changing gear, comprising a drive shaft, a driven shaft, a plurality of gears adapted to be locked to one of said shafts, a plurality of gears mounted on the other of said shafts and intermeshing with the corresponding first-mentioned gears, the gears on one of said shafts varying in size, whereby different relative rates of rotation of the shafts may be secured, selective means for locking any one of the other set of gears to its shaft, and means for unlocking all of the different sized set of gears from their shaft, save the high speed gear when the high speed gear of the other set of gears is locked to its shaft by the operation of said selective means.

2. A speed changing gear, comprising a drive shaft, a driven shaft, a plurality of gears adapted to be locked to said driven shaft, a plurality of gears mounted on said drive shaft and intermeshing with the corresponding first-mentioned gears, the gears on one of said shafts varying in size, whereby different relative rates of rotation of the shafts may be secured, selective means for locking any one of the last-mentioned gears to the drive shaft, and means for unlocking all of the first-mentioned gears from the driven shaft, save the high speed gear when the high speed gear of the drive shaft is locked thereto.

3. In combination, a driving shaft, a driven shaft, a high speed and a low speed gear upon one of said shafts and both adapted to be locked thereto, high speed and low speed pinions rotatably mounted upon the other of said shafts and continuously in mesh with said gears, controllable means for locking either of the pinions to their shaft, and means for disconnecting the low speed gear from its pinion when the high speed pinion is in locked condition.

4. In combination, a driving shaft, a driven shaft, a high speed bevel gear and a low speed bevel gear upon one of said shafts, a high speed bevel pinion and a low speed bevel pinion rotatably mounted upon the other of said shafts and continuously in mesh with said gears, selective means for locking the pinions to their shaft, and means for disconnecting the low speed gear from its shaft when the high speed pinion is locked to the other shaft.

5. In combination, a driving shaft, a driven shaft, two concentric bevel gears upon one of said shafts, adapted to be locked thereto, pinions upon the other of said shafts and continuously in mesh with said gears, controllable means for locking either of the pinions to the shaft, and means for disconnecting one of said gears from its shaft when the pinion of the other gear is locked to the other shaft.

6. In combination, a driving shaft, a driven shaft, two concentric bevel gear wheels upon one of said shafts, adapted to be locked thereto, bevel pinions rotatably mounted upon the other of said shafts and continuously in mesh with said gear wheels, clutches adapted to lock either of said pinions to the shaft, and a clutch for disconnecting one of said bevel gear wheels from its shaft.

7. In combination, a driving shaft, a driven shaft, two concentric bevel gear wheels upon one of said shafts, one of said gear wheels being rigidly secured thereto and the other of said gear wheels being rotatably mounted thereon, bevel pinions rotatably mounted upon the other of said shafts and continuously in mesh with said gear wheels, clutches for locking either of the pinions to the shaft, and a clutch for locking the rotatably mounted gear wheel to its shaft save when the pinion meshing with the other is locked to the other shaft.

8. In combination, a driving shaft, a driven shaft, a bevel gear wheel mounted upon one of said shafts, a second bevel gear wheel mounted upon the same shaft and having a plurality of gear faces concentric with the gear face of the first mentioned gear wheel, bevel pinions upon the other shaft and meshing with the several faces of the bevel gear wheels, and clutches connecting any one of said pinions to their shaft.

9. In combination, a driving shaft, a driven shaft, a gear wheel mounted upon one of said shafts and rigidly secured thereto, a second gear wheel rotatably mounted upon said shaft and having a plurality of gear faces, a plurality of pinions mounted upon the other shaft and adapted to mesh with the several gear faces of the two gear wheels, clutches for operatively connecting any one of said pinions to their shaft, and a clutch for operatively connecting the multi-faced gear wheel to its shaft.

10. In combination, a driving shaft, a driven shaft, a bevel gear wheel upon one of said shafts, pinions rotatably mounted upon the other of said shafts, a collar intermediate said pinions and having oppositely disposed teeth adapted to engage in recesses in the respective pinions, keys secured to said collar and movable in keyways in said shaft, a second collar surrounding said shaft and secured to said keys, and operating means in engagement with said last mentioned collar.

11. In combination, a drive shaft, a driven shaft, a gear wheel mounted upon one of said shafts, two pinions, mounted upon the other of said shafts and in engagement with said gear wheel, a collar intermediate said pinions and adapted to engage with the face of either of them to cause their rotation with the shaft, keys connected to said collar and extending through one of said pinions in keyways in said shaft, operating means in engagement with said keys for moving said collar, and a ball bearing surrounding said collar and having oppositely disposed raceway-forming members carried by said pinions independent of said shaft.

12. In combination, a suitable casing, a drive shaft extending thereinto, a two-part axle extending through said casing, a transmission gearing secured to said axle, a second shaft within said casing and substantially parallel with said axle, means operatively connecting said shaft and said axle, and a speed changing gearing connecting said drive shaft and said second shaft.

13. In combination, a suitable casing, a drive shaft extending thereinto, a two-part axle extending through said casing, a driven shaft within said casing and substantially parallel to said axle, a transmission gearing secured to said axle, a sprocket wheel secured to said driven shaft, a chain connecting said sprocket wheel and said transmission gearing, and speed changing gearing within said casing and connecting said drive shaft and said driven shaft.

In testimony whereof I have signed my name to this specification in the presence of two subscribing witnesses.

CHARLES HENRY LEE.

Witnesses:
ANDREW R. SCULLY.
FRED C. CRAMER.